Nov. 18, 1930.　　　F. WEIDLINGER　　　1,781,888
DIRECTION INDICATOR
Filed July 13, 1928　　　4 Sheets-Sheet 1
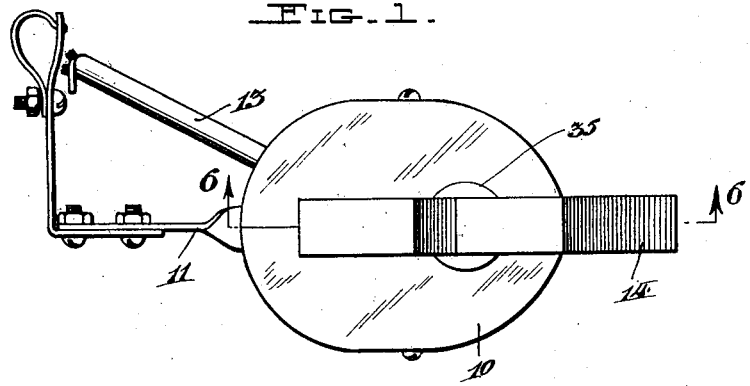
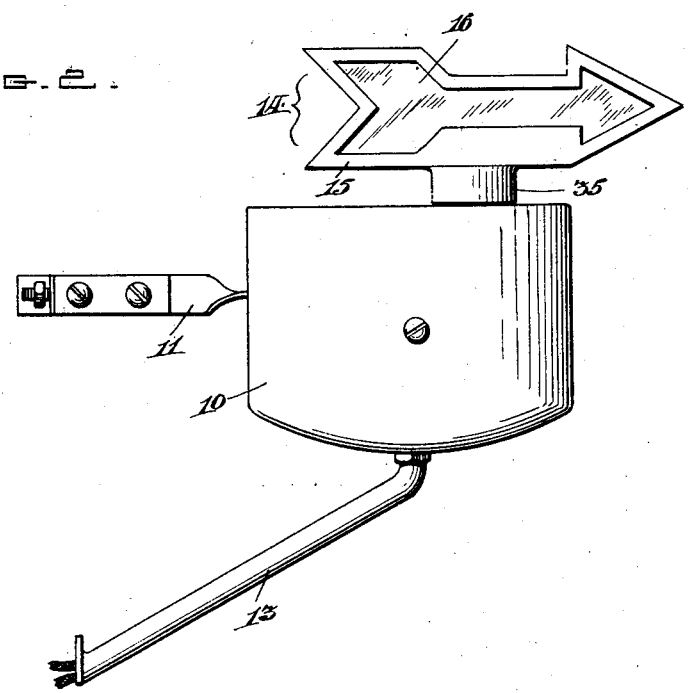
WITNESSES:
INVENTOR:
Frank Weidlinger,
BY
ATTORNEY.

Nov. 18, 1930.  F. WEIDLINGER  1,781,888
DIRECTION INDICATOR
Filed July 13, 1928  4 Sheets-Sheet 2
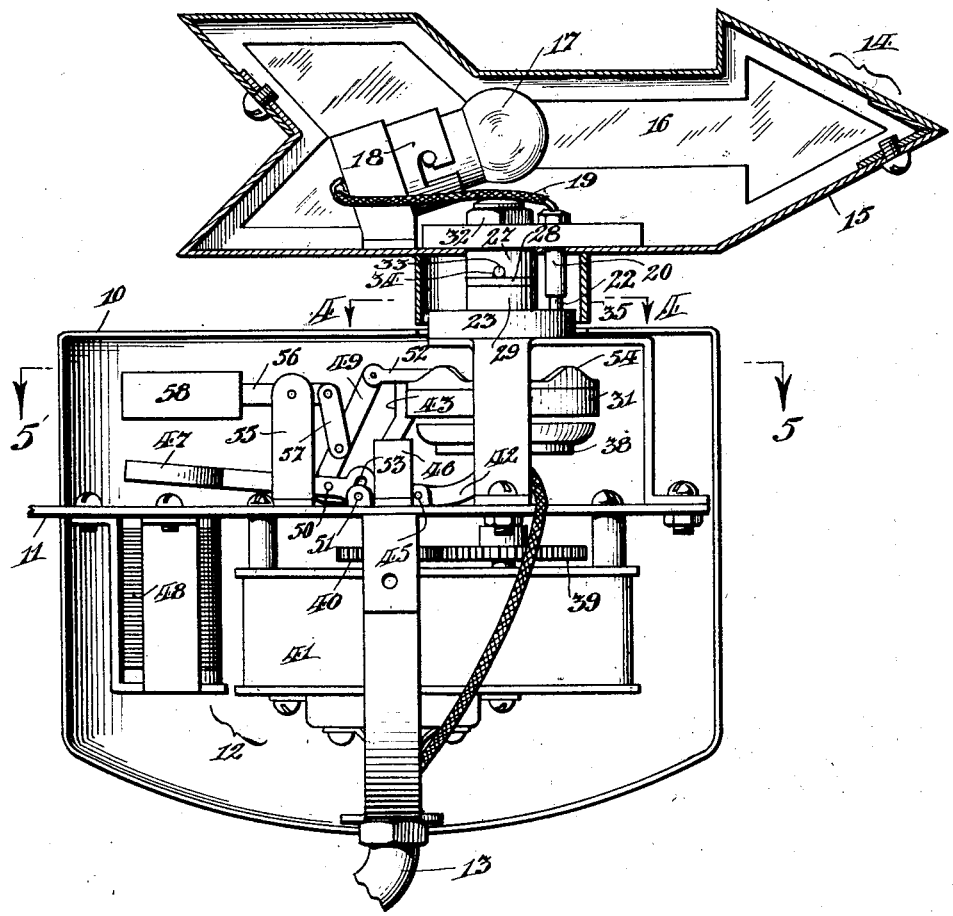
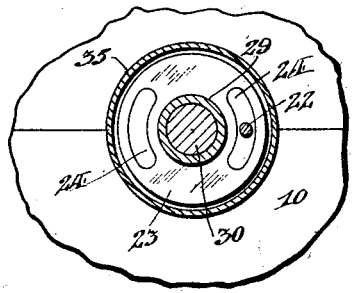
WITNESSES:
INVENTOR:
Frank Weidlinger,
BY
ATTORNEY.

Nov. 18, 1930.  F. WEIDLINGER  1,781,888
DIRECTION INDICATOR
Filed July 13, 1928  4 Sheets-Sheet 3

WITNESSES:
Alfred E. Oschinger.
W.P. Murul

INVENTOR:
Frank Weidlinger,
BY
Joshua R.H. Potts
ATTORNEY.

Nov. 18, 1930.  F. WEIDLINGER  1,781,888
DIRECTION INDICATOR
Filed July 13, 1928  4 Sheets-Sheet 4

WITNESSES:

INVENTOR:
Frank Weidlinger,
BY
Joshua R H Potts
ATTORNEY.

Patented Nov. 18, 1930

1,781,888

UNITED STATES PATENT OFFICE

FRANK WEIDLINGER, OF BETHLEHEM, PENNSYLVANIA

DIRECTION INDICATOR

Application filed July 13, 1928. Serial No. 292,483.

My invention relates to signaling devices and more particularly to a direction indicator for use on motor vehicles.

The object of the invention is to provide a direction indicator having a pointer, for indicating the direction in which a moving vehicle is to be turned, and means for illuminating the pointer when it is pointing in certain directions.

The above object is accomplished by providing a pointer secured to a pointer shaft which is rotatably mounted in a suitable frame, the shaft having a clutch wheel connected therewith with which a clutch member rotatably mounted adjacent thereto is adapted to be brought into driving engagement.

Associated with the clutch member is suitable means for moving the said member into engagement with the clutch wheel and the clutch wheel has associated therewith means for stopping its rotation in proper signaling positions as well as in neutral positions.

The actuating mechanism may be electromagnetically controlled through suitable switch manipulation in the circuit including the electro-magnetic means.

A latching mechanism may be provided for stopping the rotation in these positions which will operate alternately to connect the clutch and clutch wheel and for stopping the clutch wheel.

Figure 1 is a top plan view of an embodiment of my invention arranged to be mounted upon the side of a vehicle and with the pointer in position to indicate that the vehicle is about to make a turn, and Figure 2 a side view thereof.

Figure 5:
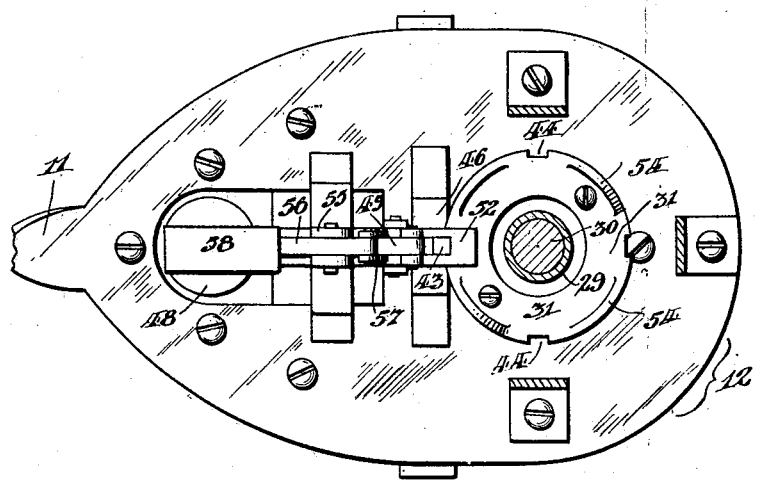
Figure 6:
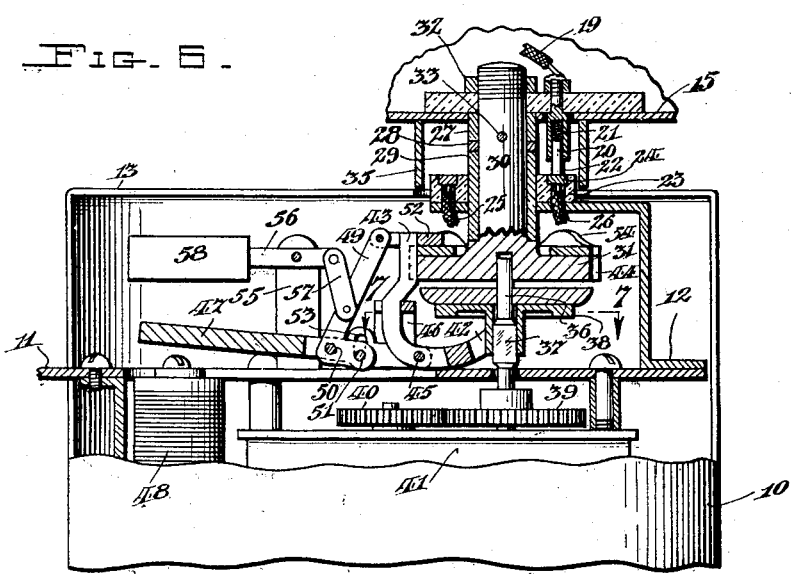
Figure 7:
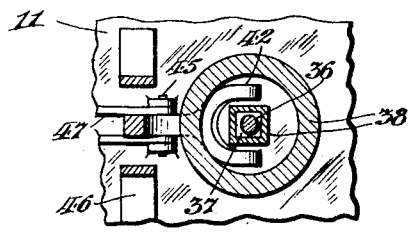
Figure 8:
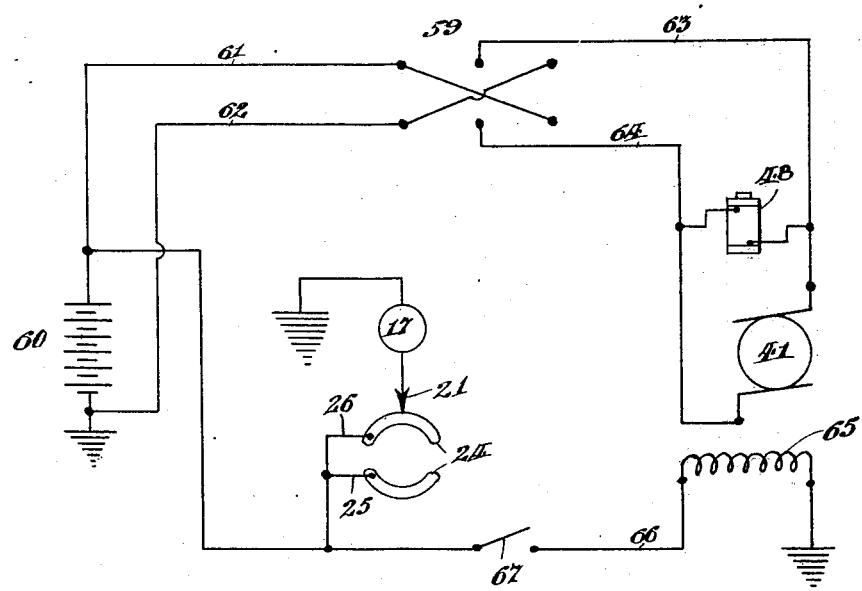

Figure 3 is an enlarged side view of the indicator shown in Figure 1, with part of the casing removed and the pointer shown in section, Figure 4 a fragmentary plan view taken on line 4—4 on Figure 3, Figure 5 a plan view, partly in section, taken on line 5—5 on Figure 3 but with the casing omitted, Figure 6 a fragmentary longitudinal section, as indicated by line 6—6 on Figure 1, Figure 7 a fragmentary plan view taken on line 7—7 on Figure 6, and Figure 8 a wiring diagram.

Referring to the drawings, 10 indicates a casing, housing most of the working parts and attachable to a motor vehicle by a support 11 which extends into the casing and forms a part of a frame 12 which supports a motor and other working parts. The casing is also supported by a brace 13 which is preferably hollow to accommodate electrical conductors. A pointer 14, preferably representing an arrow, is mounted for rotation above the casing and consists of a shell 15 having openings in each side covered with transparent material 16.

The arrow contains an electric lamp 17 mounted in a socket 18 which has one terminal grounded to the shell and the other connected by a wire 19 to a brush 20 extending through the bottom of the shell and containing a spring 21 for holding a carbon tip 22 against a dielectric ring 23 fixed to the frame. A pair of segmental contacts 24 are embedded in ring 23, connected to a source of electric energy by wires 25 and 26, and so located that lamp 17 will be illuminated only when the arrow is pointing to the right or left.

A bearing 27 is secured to the under side of shell 15 and rests upon a wearing ring 28 supported by a bearing 29 fixed in the frame and extending through ring 23. A shaft 30, rotatably mounted in bearing 29 and extending through bearing 27 and into the arrow, has a clutch wheel 31, fixed on its lower end and abutting the bottom end of bearing 29, and a nut 32 threaded onto its upper end for holding the arrow against removal therefrom. Shaft 30 is fixed for rotation with the arrow by a pin 33 which extends through the shaft and through notches 34 in the side walls of bearing 27. In order to cover brush 20 and ring 23 and exclude foreign matter, a shield 35 is secured to the under side of shell 15 with its lower edge in close proximity to casing 10.

A shaft 36, having one end rotatably mounted in clutch wheel 31, has a square part 37 upon which a clutch member 38 is slidably mounted. A gear 39 is fixed on shaft 36 and meshes with a gear 40 fixed on the armature shaft of a motor 41 secured to the frame; the lower end of shaft 36 being rotatably mounted in the casing of the motor.

The bifurcated end of a clutch lever 42 straddles shaft 36 and abuts the under side of clutch member 38. The other end of lever 42 extends upwardly and forms a dog 43 adapted to engage any one of four notches 44 formed in clutch wheel 31. Lever 42 is pivoted on a pin 45 in the frame and dog 43 is held against lateral movement by a guide 46 secured to the frame. Lever 42 is so proportioned that, when dog 43 has been withdrawn from a notch 44 and its face is riding upon the periphery of clutch wheel 31, its bifurcated end will hold clutch member 38 in engagement with the lower or clutching face of clutch wheel 31.

A magnet armature 47 has one end bifurcated and pivoted on pin 45, at either side of lever 42, and its other end disposed above an electro-magnet 48 mounted in the frame. A bell crank 49, extending through the bifurcated end of armature 47 and pivoted on a pin 50 fixed therein, has one arm rockably mounted on a pin 51 fixed in the frame and its other arm hinged to a latch 52 which rests upon the top of clutch wheel 31 and engages the upper end of dog 43. Pin 51 passes through slots 53 in the bifurcated end of armature 47 so that, when the magnet is energized, the armature will rock on pin 45 and cause pin 50 to swing bell crank 49 on pin 51 and draw latch 52 outwardly, consequently drawing dog 43 out of notch 44 and forcing clutch member 38 against the underside of clutch wheel 31.

Cam faces 54 are formed or secured on the top of clutch wheel 31 between notches 44 so that, as the clutch wheel rotates, one of these cam faces will engage latch 52 and disengage it from dog 43, allowing the dog to ride upon the periphery of the clutch wheel and drop into the next notch 44, automatically releasing the pressure of clutch lever 42 on clutch member 38 and stopping rotation of the clutch wheel and arrow.

Ears 55 are secured to or formed on the frame and have a weighted arm 56 pivoted between them and connected to bell crank 49 by links 57. A weight 58, on the free end of arm 56, is sufficiently heavy to raise bell crank 49 and armature 47 when magnet 48 is de-energized and allow latch 52 to reengage dog 43.

In Figure 8, which shows one method of electrically connecting the different parts of the device, 59 represents a pole changing switch, which may be actuated by any usual means, having two terminals connected to the terminals of a battery 60 or other source of energy by wires 61 and 62 and two terminals connected to motor 41 by wires 63 and 64. The negative terminal of the battery is grounded to the frame, magnet 48 connected between wires 63 and 64, one side of the field 65 of the motor grounded to the frame, and its other side connected to the positive terminal of the battery by a wire 66. A normally open switch 67, connected into wire 66, is adapted to be closed each time switch 59 is operated and segmental contacts 24 are connected to wire 66 between switch 67 and the battery by means of wires 25 and 26.

When switch 59 is operated to connect wire 61 to wire 63 and wire 62 to wire 64, current will flow from the battery through wire 61, wire 63, the armature of motor 41, wire 64 and wire 62 back to the battery and rotate the armature of the motor in one direction. When switch 59 is operated to connect wire 61 to wire 64 and wire 62 to wire 63, current will flow from the battery through wire 61, wire 64, the armature of the motor, wire 63 and wire 62, back to the battery and rotate the armature in the opposite direction as the current always flows in the same direction through the field of the motor.

As segments 24 are connected to wire 66 between the battery and switch 67, lamp 17 will be illuminated whenever the arrow is swung to the right or left to bring the point of brush 21 in contact with a segmental contact and it will remain illuminated until the arrow is swung to point forwardly or rearwardly. As magnet 48 is connected between wires 63 and 64, it will be energized each time switch 59 is operated.

Assuming that the direction indicator shown is mounted upon the left side of a motor vehicle, connected as just described with the arrow pointing forwardly, and that the operator wishes to turn to the left, he will operate switch 59 to rotate the armature of the motor to swing the arrow into the position shown in the drawings. Magnet 48 will be energized and attract armature 47 which will draw dog 43 out of notch 44 and force clutch member 38 against clutch wheel 31, thus imparting rotation to the clutch wheel and the arrow. As the clutch wheel rotates, a cam face 54 will disengage latch 52 from dog 43 and, when the arrow has swung approximately 90°, the next notch 44 will be engaged by dog 43, simultaneously stopping rotation of the clutch wheel and arrow and disengaging clutch member 38.

After making the turn, the operator should operate switch 59 to swing the arrow in the opposite direction so that it will point forward. If the vehicle is to be turned to the right, switch 59 is operated to rotate the armature of the motor in the opposite direction. If the vehicle is to be moved rearwardly, switch 59 is closed twice in succession to rotate the arrow two quarter-turns.

The apparatus as illustrated and described may be varied in numerous details from the specific disclosures without departing from the scope of the invention as hereinbefore set forth and hereinafter claimed.

I claim:

1. A direction indicator including a frame, a shaft rotatable therein, a pointer on the shaft, a perimetrically notched clutch wheel on the shaft, a rotatable clutch member, means for rotating the clutch member, a lever for moving the clutch member into engagement with the clutch wheel, a dog carried by the lever for engaging the notches in the clutch wheel, and means for actuating the lever and moving the dog into such notch engaging position.

2. A direction indicator including a frame, a pointer shaft rotatable therein, a pointer on the shaft, a notched clutch wheel on the shaft, a rotatable clutch member, means for rotating the clutch member, a lever for moving the clutch member against the clutch wheel, a dog integral with the lever for engaging a notch in the clutch wheel, and means for withdrawing the dog from a notch and causing the lever to move the clutch member.

3. A direction indicator including a frame, a pointer shaft rotatable in the frame, a pointer on the shaft, a notched clutch wheel on the shaft, a rotatable clutch member, means for rotating the clutch member, a lever for moving the clutch member against the clutch wheel, a dog integral with the lever for engaging a notch in the clutch wheel, and means for withdrawing the dog from a notch and causing the lever to move the clutch member; the lever being so proportioned that the clutch member will be held in engagement with the clutch wheel when the dog is engaging the periphery of the wheel.

4. A direction indicator including a frame, a pointer shaft rotatable therein, a pointer on the shaft, a peripherally notched clutch wheel on the shaft, a rotatable clutch member, means for rotating the clutch member, a lever for moving the clutch member against the clutch wheel, a dog carried by the lever for engaging a notch in the clutch wheel, a latch, means for actuating the latch to engage the dog, and means for disengaging the latch from the dog.

5. A direction indicator including a frame, a pointer shaft rotatable therein, a pointer on the shaft, a notched clutch wheel on the shaft, a rotatable clutch member, means for rotating the clutch member, a lever for moving the clutch member against the clutch wheel, a dog integral with the lever for engaging a notch in the clutch wheel, a latch engaging the dog, cam faces on the clutch wheel for disengaging the latch from the dog, an armature rockable in the frame, a magnet adjacent one end of the armature, a bell crank hinged in the frame and connecting the armature and latch, and means for energizing the magnet.

6. A direction indicator including a frame, a pointer shaft rotatable therein, a pointer on the shaft, a notched clutch wheel on the shaft, a rotatable clutch member, means for rotating the clutch member, a lever for moving the clutch member against the clutch wheel, a dog integral with the lever for engaging a notch in the clutch wheel, a latch engaging the dog, cam faces on the clutch wheel for disengaging the latch from the dog, an armature rockable in the frame, a magnet adjacent one end of the armature, a bell crank hinged in the frame and connecting the armature and latch, means for energizing the magnet, a link hinged to the bell crank, and a weighted arm connected to the link and rockable in the frame.

7. A direction indicator including a rotatable pointer, a wheel connected therewith and provided with radially extended notches spaced about its perimeter, means for rotating the pointer and a bell crank lever adapted to engage one leg with a notch in said wheel to lock the pointer against rotation, said lever operating simultaneously to disengage itself from the notch and to render said means effective for rotating the pointer.

8. A direction indicator including a rotatably mounted pointer, a peripherally notched wheel connected with the pointer for rotation therewith, rotating means adapted to be moved into co-axial engagement with the wheel for rotating the same, a bell crank lever having one leg adapted to engage in said notches and the other to move said means into engagement with said wheel respectively when the lever is oscillated in opposite directions, and means for oscillating said lever.

In testimony whereof I have signed my name to this specification.

FRANK WEIDLINGER.